(12) United States Patent
Li et al.

(10) Patent No.: US 11,218,952 B2
(45) Date of Patent: Jan. 4, 2022

(54) METHOD AND DEVICE FOR CONFIGURING NETWORK SLICE

(71) Applicant: XI'AN ZHONGXING NEW SOFTWARE CO., LTD., Shaanxi (CN)

(72) Inventors: Dapeng Li, Guangdong (CN); Li Yang, Guangdong (CN); Jing Liu, Guangdong (CN)

(73) Assignee: XI'AN ZHONGXING NEW SOFTWARE CO., LTD.

( * ) Notice: Subject to any disclaimer, the term of this patent is extended or adjusted under 35 U.S.C. 154(b) by 0 days.

(21) Appl. No.: 16/648,710

(22) PCT Filed: Sep. 20, 2018

(86) PCT No.: PCT/CN2018/106666
§ 371 (c)(1),
(2) Date: Mar. 19, 2020

(87) PCT Pub. No.: WO2019/057106
PCT Pub. Date: Mar. 28, 2019

(65) Prior Publication Data
US 2020/0288384 A1  Sep. 10, 2020

(30) Foreign Application Priority Data

Sep. 22, 2017  (CN) .......................... 201710868332.5

(51) Int. Cl.
*H04W 4/00* (2018.01)
*H04W 48/16* (2009.01)
(Continued)

(52) U.S. Cl.
CPC ........... *H04W 48/16* (2013.01); *H04W 8/245* (2013.01); *H04W 60/005* (2013.01); *H04W 84/18* (2013.01)

(58) Field of Classification Search
CPC ..... H04W 48/16; H04W 48/18; H04W 12/06; H04W 36/14; H04W 8/245; H04W 8/26; (Continued)

(56) References Cited

U.S. PATENT DOCUMENTS

2017/0070892 A1* 3/2017 Song ...................... H04W 48/20
2018/0242304 A1* 8/2018 Rong .................. H04W 72/048
(Continued)

FOREIGN PATENT DOCUMENTS

| CN | 106412905 A | 2/2017 |
|---|---|---|
| CN | 106993329 A | 7/2017 |
| WO | 2017063708 A1 | 4/2017 |

OTHER PUBLICATIONS

International Search Report dated Dec. 5, 2018; International Patent Application No. PCT/CN2018/106666 filed on Sep. 20, 2018; ISA/CN.
(Continued)

*Primary Examiner* — Temica M Beamer
(74) *Attorney, Agent, or Firm* — McDonald Hopkins LLC

(57) ABSTRACT

Provided are a method and device for configuring a network slice. A master base station generates joint network slice information according to network slice information of the master base station and network slice information of a secondary base station, and sends the joint network slice information to a core network element.

18 Claims, 5 Drawing Sheets

(51) Int. Cl.
*H04W 8/24* (2009.01)
*H04W 60/00* (2009.01)
*H04W 84/18* (2009.01)

(58) Field of Classification Search
CPC ....... H04W 8/04; H04W 60/00; H04W 60/04; H04W 60/005; H04W 28/04; H04W 72/04; H04W 72/042; H04W 88/08; H04W 88/06; H04L 5/0007
USPC ............................ 370/329; 455/435.1, 435.2
See application file for complete search history.

(56) References Cited

U.S. PATENT DOCUMENTS

| | | | | |
|---|---|---|---|---|
| 2018/0302877 A1* | 10/2018 | Bosch | ................... | H04W 76/10 |
| 2018/0324663 A1* | 11/2018 | Park | ...................... | H04W 36/08 |
| 2019/0082363 A1* | 3/2019 | Park | ...................... | H04W 76/18 |
| 2020/0178158 A1* | 6/2020 | Won | ...................... | H04W 48/18 |
| 2020/0267614 A1* | 8/2020 | Park | ...................... | H04W 36/38 |
| 2020/0336954 A1* | 10/2020 | Park | ...................... | H04W 24/10 |
| 2021/0007171 A1* | 1/2021 | Jeon | ..................... | H04W 74/006 |
| 2021/0014818 A9* | 1/2021 | Park | ...................... | H04W 76/27 |

OTHER PUBLICATIONS

"Slice Availability Impact on Dual Connectivity," 3GPP Draft; R3-171666. 2017.
"3rd Generation Partnership Project; Technical Specification Group Services and System Aspects; Study on Architecture for Next Generation System," 3GPP, Architecture, NextGen Study.
"3rd Generation Partnership Project; Technical Specification Group Radio Access Network; Study on new radio access technology: Radio access architecture and interfaces (Release 14)," 3GPP.
"Clarification on UE slice connectivity," 3GPP Draft; R3-170723. 2017.
Extended European Search Report for Application 18859150.7, PCT/CN2018/106666, dated May 11, 2021, 11 pgs., European Patent Office, Germany.

* cited by examiner

METHOD AND DEVICE FOR CONFIGURING NETWORK SLICE

CROSS-REFERENCE TO RELATED APPLICATION

This application is a 35 U.S.C. 371 national stage filing of PCT Application No. PCT/CN2018/106666 filed on Sep. 20, 2018, which claims priority to Chinese patent application No. 201710868332.5 filed on Sep. 22, 2017, the disclosure of each of which is incorporated herein by reference in their entirety.

TECHNICAL FIELD

The present application relates to communications and, for example, to a method and device for configuring a network slice.

BACKGROUND

With the enhancement of network deployment and capabilities of terminals, a terminal is able to be connected to multiple base stations for services. Among them, multiple micro cell clusters are distributed in a macro cell, and the terminal is able to maintain a data connection with the macro cell and maintain a data connection with at least one micro cell at the same time. This architecture is called as a multi-connection architecture.

A network slice is a set consisted of a group of network functions, resources that run these network functions, and specific configurations of these network functions. These network functions and their corresponding configurations form a complete logical network. This logical network contains network characteristics required by a specific service for providing corresponding network services for this specific service scenario.

The multi-connection architecture and network slice are both cutting-edge technology directions in communication technologies. However, the combination of these two technologies will cause many inconveniences.

SUMMARY

The following is a summary of the subject matter described herein in detail. This summary is not intended to limit the scope of the claims.

The present application provides a method and device for configuring a network slice capable of avoiding the inconvenience caused by the combination of the multi-connection and network slices.

An embodiment of the present application provides a method for configuring a network slice. The method includes: generating joint network slice information by a master base station according to network slice information of the master base station and network slice information of a secondary base station; and sending the joint network slice information to a core network element from the master base station.

An embodiment of the present application provides a method for configuring a network slice. The method includes: receiving joint network slice information by a core network element; receiving a registration request of a terminal by the core network element; configuring registration network slice information by the core network element according to the joint network slice information and the registration request; and sending the registration network slice information to a master base station from the core network element.

An embodiment of the present application provides a method for configuring a network slice. The method includes: sending a registration request to a master base station by a terminal; receiving, by the terminal, registration network slice information sent from the master base station, where the registration network slice information is configured by the core network element according to joint network slice information and the registration request; and acquiring a network slice service by the terminal according to the registration network slice information.

An embodiment of the present application provides a device for configuring a network slice. The device includes: a generating module configured to generate joint network slice information according to network slice information of a master base station and network slice information of a secondary base station; and a first sending module configured to send the joint network slice information to a core network element.

An embodiment of the present application provides a device for configuring a network slice. The device includes: a first receiving module configured to receive joint network slice information sent by a master base station; a second receiving module configured to receive a registration request sent by a terminal; a configuring module configured to configure registration network slice information according to the joint network slice information and the registration request; and a second sending module configured to send the registration network slice information to the master base station.

An embodiment of the present application provides a device for configuring a network slice. The device includes: a sending module configured to send a registration request to a master base station; a receiving module configured to receive registration network slice information sent by the master base station, where the registration network slice information is configured by a core network element according to joint network slice information and the registration request; an acquisition module configured to acquire a network slice service according to the registration network slice information.

An embodiment of the present application provides a computer-readable storage medium storing at least one program. The at least one program is executable by at least one processor, to perform the method for configuring a network slice in any embodiment described above.

An embodiment of the present application further provides a processor. The processor is configured to execute programs which, when executed, perform the method for configuring a network slice in any embodiment described above.

Other aspects can be understood after the drawings and the detailed description are read and understood.

BRIEF DESCRIPTION OF DRAWINGS

The drawings used in description of the embodiments or in the existing art will be briefly described below. Apparently, the drawings described below illustrate part of embodiments of the present application, and those of ordinary skill in the art may obtain other drawings based on the drawings described below on the premise that no creative work is done.

DETAILED DESCRIPTION

Figure 1:
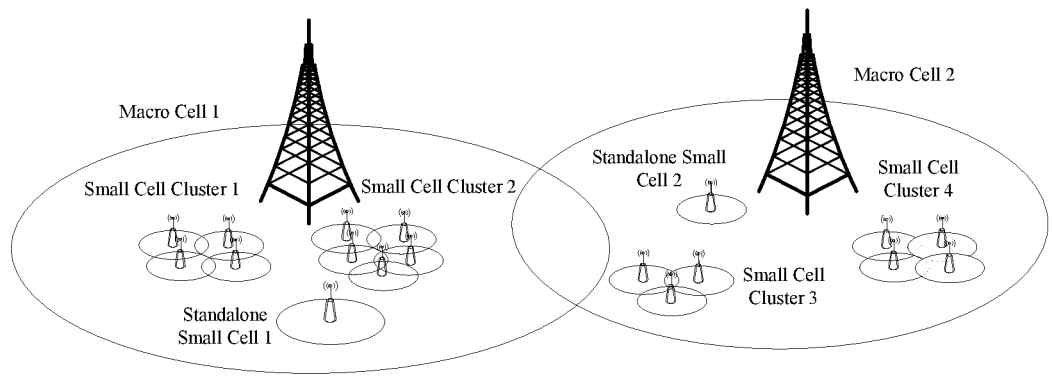
FIG. 1 is a schematic diagram illustrating a multi-connection architecture in the existing art.

The technical solutions in the embodiment of the present disclosure will be described in connection with the drawing in the embodiment of the present application. The embodiment described below is part, not all, of the embodiments of the present application.

One form of a multi-connection architecture in the existing art is shown in FIG. 1. In macro cell 1, two small cell clusters and one standalone cell are distributed. In the multi-connection architecture of FIG. 1, the terminal can maintain a data connection with macro cell 1 and maintain the data connection with at least one small cell in the at least one small cell clusters (such as a small cell in small cell cluster 1 or small cell cluster 2) simultaneously. An architecture similar to the above is called as the multi-connection architecture.

Figure 2:
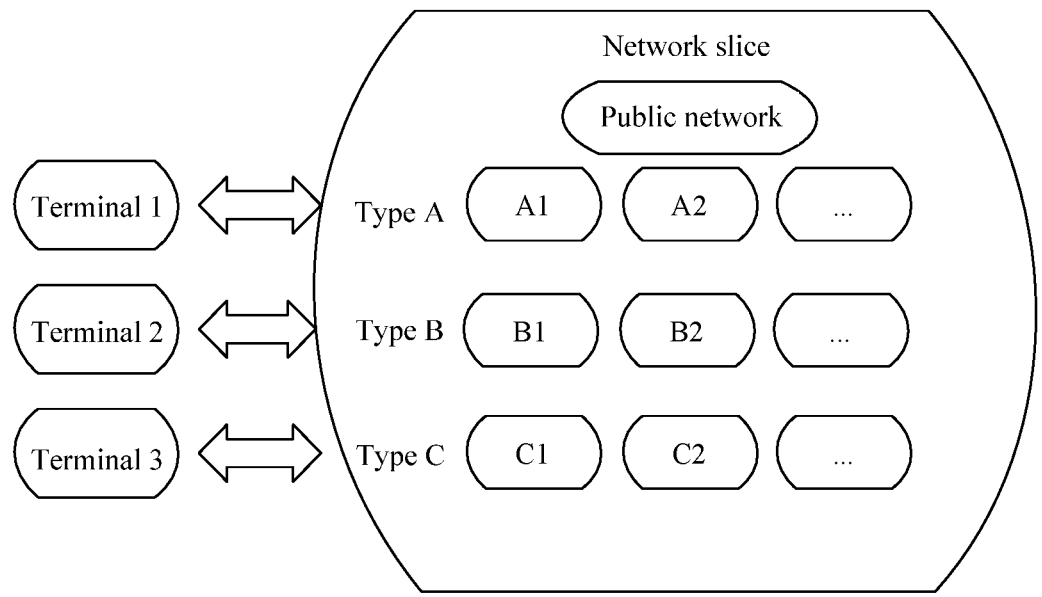
FIG. 2 is a schematic diagram illustrating a universal network slice in the existing art.

In the existing art, a typical network slice includes a set of virtualized access network functions and core network functions. The network slice is constructed by the operator according to requirements and strategies. Functions included in a network slice are also determined by the operator according to the requirements and strategies. For example, some network slices may include dedicated forwarding planes in addition to the control plane functions; and some network slices may only include some basic control plane functions. FIG. 2 is a schematic diagram illustrating a universal network slice in the existing art. Among them, the universal network provides services for universal traffic. A customized network slice will be generated through network slicing to provide three different types of services. For example, type A is for ultra-high-speed traffic, such as video traffic and virtual reality, etc.; type B is for burst small traffic data traffic, such as QQ, WeChat, etc.; type C is for low-latency ultra-reliable traffic, such as Internet of Vehicles, smart grid, etc. Different network slice instances (such as instances with different traffic requirements and business models) are generated for each type according to some differences. For example, type A is used for performing the video traffic, and is divided into slice A1 supporting ordinary videos and slice A2 supporting high-definition videos according to service rate requirements of the video type. A network slice forms a virtual network to provide a specific mobile network access service for the terminal.

Figure 3:
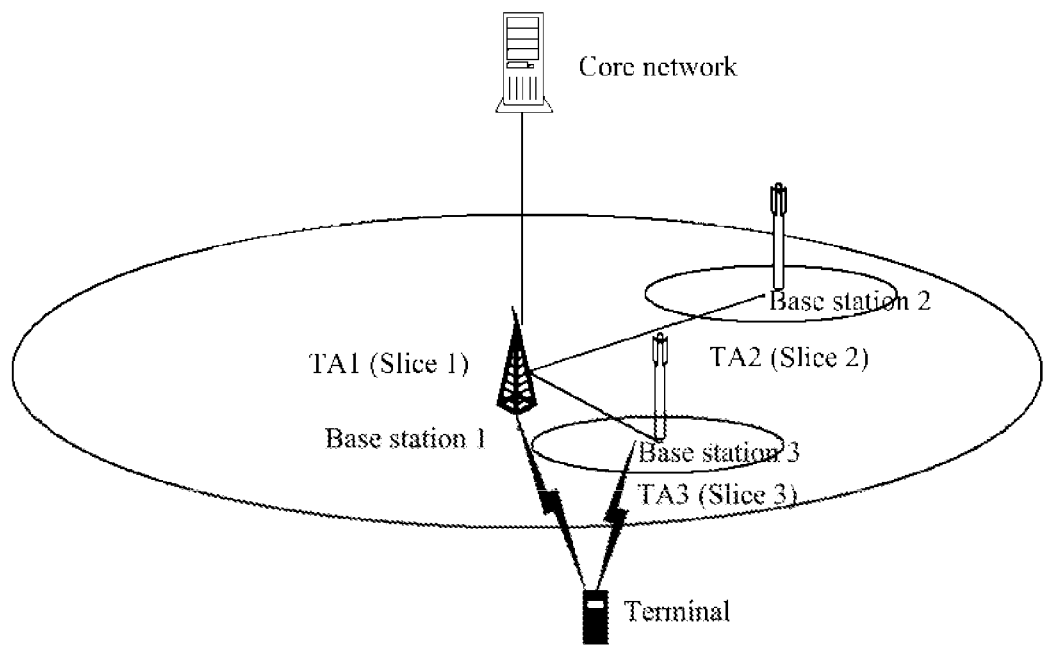
FIG. 3 is a schematic diagram illustrating network slice deployment in a multi-connection architecture in the existing art.

One possible way to combine the two related technologies described above is deployment of network slices in a multi-connection architecture. FIG. 3 illustrates a form of network slice deployment in a multi-connection architecture. Within a coverage area of a macro-serving cell of base station 1 (which is called as a master base station), micro-serving cells of base station 2 and base station 3 (which are called as secondary base stations) are separately configured. The base station 1 supports network slice 1, the base station 2 supports network slice 2, and the base station 3 supports network slice 3. However, only the base station 1 has a control plane connection with the core network element, while the base station 2 and the base station 3 in a dual-connected or multi-connected working mode as the secondary base station has no control plane connection with the core network element. Therefore, the core network element does not know slicing capabilities of base stations 2 and 3.

Therefore, when the base station and the core network element interacts information, not only slice capability information supported by the base station 1 needs to be carried, but also slice capability information of the base station 2 and the base station 3 needs to be carried. In this way, the core network element can know slicing capabilities of the base station 2 and the base station 3. The core network element is able to configure resources on these slices for a terminal to be served and provide wireless bearer services corresponding to the slices, so that the terminal can enter the dual-connected or multi-connected working mode.

In view of the above matter, the embodiment of the present application proposes a method for configuring a network slice, which can enable the slice capability information of the secondary base station to be known to the core network element, so that the core network element configures the resources on these slices for the terminal, and provides wireless bearer traffic corresponding to the slices, and the terminal is able to enter the dual-connected or multi-connected working mode.

Figure 4:
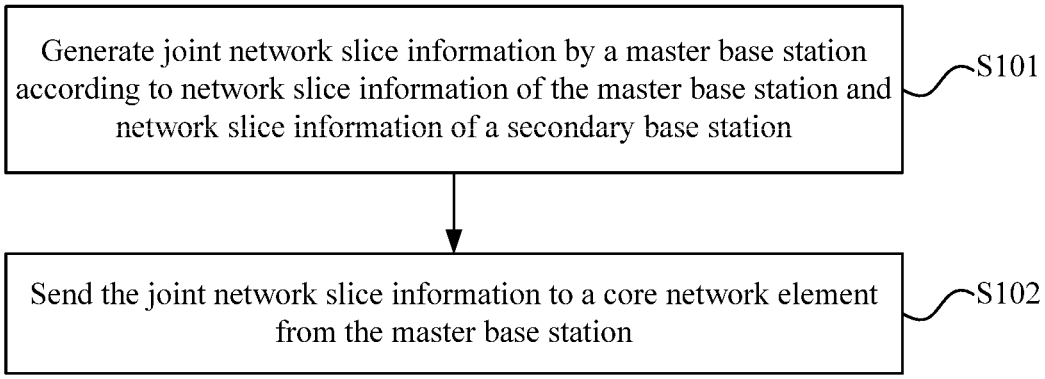
FIG. 4 is a flowchart illustrating a method for configuring a network slice according to an embodiment of the present application.

An embodiment of the present application is shown in FIG. 4. FIG. 4 shows a method for configuring a network slice. The method is applied to a master base station, and includes steps S101 and S102.

In step S101, a master base station generates joint network slice information according to network slice information of the master base station and network slice information of a secondary base station.

In step S102, the master base station sends the joint network slice information to a core network element.

In the embodiment, the master base station generates joint network slice information according to network slice information of the master base station and the network slice information of the secondary base station, and sends the joint network slice information to the core network element. Through the above solution, when interacting with the core network element, the master base station carries not only the network slice information of the master base station but also the network slice information of the secondary base station. Therefore, the core network element may acquire network slice information of the secondary base station having no control plane connection with the core network element.

Details of the above steps are described below.

Before step S101, the master base station acquires the network slice information of the secondary base station.

The network slice information of the secondary base station is sent to the master base station by the secondary base station. The network slice information of the secondary base station includes: a registration region of the secondary base station and slice capability information of the secondary base station (i.e., a registration region and slice capability information supported by the secondary base station). The registration region of the secondary base station may be a tracking area (TA) of the secondary base station. The slice capability information of the secondary base station is used by the core network element for configuring resources of the slice for the terminal, so as to provide a radio bearer service corresponding to the slice. The slice capability information of the secondary base station is the slice capability information corresponding to the network slice service provided by the secondary base station.

In step S101, the master base station generates the joint network slice information according to the network slice information of the master base station and the network slice information of the secondary base station.

The network slice information of the master base station includes: a registration region of the master base station and slice capability information of the master base station (i.e., a registration region and slice capability information supported by the master base station). The registration region of the master base station may be a tracking area (TA) of the master base station. The slice capability information of the master base station is used by the core network element for configuring resources of the slice for the terminal, so as to provide the radio bearer service corresponding to the slice. The slice capability information of the master base station is the slice capability information about the network slice service provided by the master base station.

There are two different manners for generating the joint network slice information.

Manner one: the master base station adds the slice capability information of the secondary base station in the network slice information of the master base station. In this manner, the joint network slice information includes: a registration region of the master base station, the slice capability information of the master base station, and the slice capability information of the secondary base station.

Manner two: the master base station adds the slice capability information and the registration region of the secondary base station in the network slice information of the master base station. In this manner, the joint network slice information includes: the registration region of the master base station, the slice capability information of the master base station, the registration region of the secondary base station and the slice capability information of the secondary base station.

In an embodiment, on the basis of manner two, the joint network slice information further includes indication information. The indication information is used for indicating whether the terminal satisfies a multi-connection condition. Only in a multi-connection architecture, the terminal is able to connect to the master base station and the secondary base station simultaneously, and a slice request for the secondary base station triggered by the terminal is received. Therefore, when the indication information does not indicate whether the terminal satisfies the multi-connection condition, the terminal does not initiate the slice request for the secondary base station, which is able to avoid unnecessary signaling attempts and improve the user experience.

The indication information may include at least one of: a multi-connection relationship between the registration region of the secondary base station and the registration region of the master base station; a multi-connection relationship between the registration region of the secondary base station and the slice capability information of the master base station; a multi-connection relationship between the slice capability information of the secondary base station and the registration region of the master base station; a multi-connection relationship between the slice capability information of the secondary base station and the slice capability information of the master base station. The multi-connection relationship is used for indicating that the terminal satisfies the multi-connection condition.

If the multi-connection relationship is satisfied, one terminal may be connected to multiple base stations for data transmission. For example, if the terminal is within coverage areas of both the master base station and the secondary base station, and the terminal, the master base station and the secondary base station are in the multi-connection architecture, then the terminal satisfies the multi-connection condition, and the indication information may be the multi-connection relationship between the registration region of the secondary base station and the registration region of the master base station. If the terminal is within the coverage area of the master base station and out of the coverage area of the secondary base station, then the terminal does not satisfy the multi-connection condition, and the joint network slice information does not carry the indication information.

In step S102, the master base station sends the joint network slice information to the core network element.

The joint network slice information may be sent to the core network element through NG-eNB configuration update, NG-gNB configuration update, an NG setup request, or a newly-defined message in an NG interface. The NG interface is an interface between a 5G core network element and an access network element, the NG-eNB configuration update is a configuration update message of the 5G core network element and a 4G base station, the NG-gNB configuration update is a configuration update message of the 5G core network element and the 5G base station, the NG setup request is a 5G interface setup request message, and the newly-defined message is for example a network slice update configuration message.

In an embodiment, on the basis of steps S101 and S102, the master base station broadcasts the network slice information of the secondary base station and the network slice information of the master base station. After receiving the broadcast information, the terminal initiates a registration request based on the information. According to the network slice information of the master base station and the secondary base station (the network slice information includes the registration region and the slice capability information), the terminal selects a possible registration region and slice capability to perform the registration request. In this way, the signalling load may be reduced, and the registration request for the impossible registration region and slice capability may be avoided. At the same time, according to the indication information, the terminal may know whether the terminal satisfies the multi-connection condition, and only when the multi-connection condition is satisfied, the terminal initiates the registration request to the secondary base station. This is because that if the terminal does not satisfy the multi-connection condition (for example, the terminal is out of the coverage area of the secondary base station), a slice request for the secondary base station initiated by the terminal will be rejected. In this way, the signaling load also can be reduced and unnecessary signaling attempts are avoided.

In an embodiment, on the basis of steps S101 and S102, the master base station receives the registration request sent by the terminal. The registration request is used for notifying the core network element of a network slice service to be acquired by the terminal.

The master base station sends the registration request to the core network element.

The master base station receives registration network slice information sent by the core network element, where the registration network slice information is configured by the core network element according to the joint network slice information and the registration request. Meanwhile, the registration network slice information includes: a registration region where the terminal is allowed to register, and slice capability information about a network slice service that is allowed to be acquired by the terminal. The registration network slice information is used for notifying the terminal of the network slice service which may be acquired by the terminal (the network slice service to be acquired by the terminal, which cannot be acquired by the terminal because some reasons such as the terminal is out of the registration region corresponding to the network slice). For example, the network slice information is generated in the above manner two, and the network slice information includes: the registration region of the master base station, the slice capability information of the master base station, the registration region of the secondary base station and the slice capability information of the secondary base station. If the network slice service to be acquired by the terminal is the network slice service of all the secondary base stations, the core network element configures the registration region of the secondary base station and the slice capability information of the secondary base station for the terminal.

The master base station sends the registration network slice information to the terminal. The terminal acquires a network slice service according to the registration network slice information after receiving the registration network slice information.

In the embodiment, the master base station receives the network slice information of the secondary base station, generates the joint network slice information according to the network slice information of the master base station and the network slice information of the secondary base station, and sends the joint network slice information to the core network element. After receiving the registration request sent by the terminal, the master base station forwards the registration request to the core network element. The core network element configures the registration network slice information according to the registration request. The master base station forwards the registration network slice information sent by the core network element to the terminal. Finally, the terminal acquires a network slice service according to the registration network slice information. Through the above solution, the core network element may configure the registration network slice information for the terminal according to the network slice information of the secondary base station having no control plane connection with the core network element, so that the terminal may acquire the network slice service corresponding to the network slice information of the secondary base station.

Figure 5:
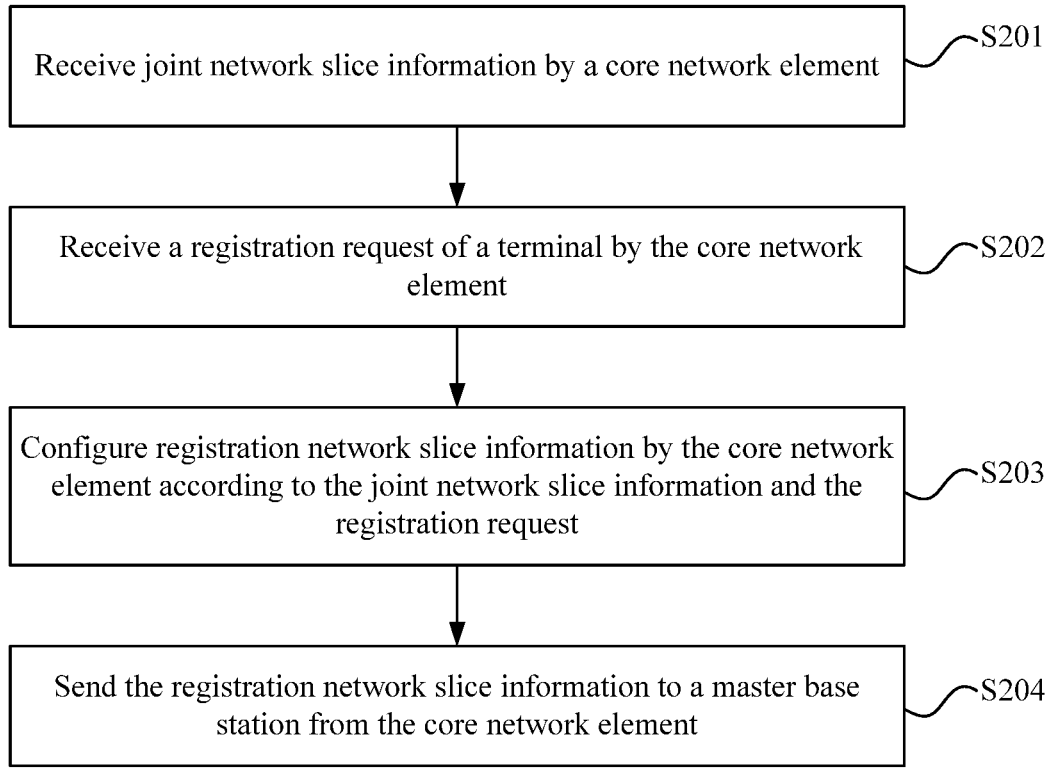
FIG. 5 is a flowchart illustrating a method for configuring a network slice according to another embodiment of the present application.

An embodiment of the present application is shown in FIG. 5. FIG. 5 shows a method for configuring a network slice. The method is applied to a core network element, and includes steps S201 to S204.

In step S201, a core network element receives joint network slice information.

In step S202, the core network element receives a registration request from a terminal.

In step S203, the core network element configures registration network slice information according to the joint network slice information and the registration request.

In step S204, the core network element sends the registration network slice information to a master base station.

In the embodiment, the core network element configures the registration network slice information according to the network slice information and the registration request, and gives the registration network slice information to the master base station. Through the above solution, the core network element may configure the network slice information of the secondary base station for the terminal, so that the terminal may acquire the network slice service corresponding to the network slice information of the secondary base station.

Details of the above steps are described below.

Before step S201, the master base station receives the network slice information of the secondary base station sent by the secondary base station, and generates the joint network slice information according to the network slice information of the master base station and the network slice information of the secondary base station. The master base station further receives the registration request sent by the terminal.

The network slice information of the master base station includes: a registration region of the master base station and slice capability information of the master base station (i.e., a registration region and slice capability information supported by the master base station). The network slice information of the secondary base station includes: a registration region of the secondary base station and slice capability information of the secondary base station (i.e., a registration region and slice capability information supported by the secondary base station).

In step S201, the core network element receives the joint network slice information.

The joint network slice information is sent to the core network element by the master base station. According to two manners of generating the joint network slice information by the master base station, the joint network slice information may include one of the following (1) to (3): (1) the registration region of the master base station, the slice capability information of the master base station, and the slice capability information of the secondary base station; (2) the registration region of the master base station, the slice capability information of the master base station, the registration region of the secondary base station, and the slice capability information of the secondary base station; (3) the registration region of the master base station, the slice capability of the master base station; the registration area of the secondary base station, the slice capability information of the secondary base station, and indication information.

The indication information is used for indicating whether the terminal satisfies the multi-connection condition, and may include at least one of: a multi-connection relationship between the registration region of the secondary base station and the registration region of the master base station; a multi-connection relationship between the registration region of the secondary base station and the slice capability information of the master base station; a multi-connection relationship between the slice capability information of the secondary base station and the registration region of the master base station; a multi-connection relationship between the slice capability information of the secondary base station and the slice capability information of the master base station. The multi-connection relationship is used for indicating that the terminal satisfies the multi-connection condition.

The joint network slice information may be sent to the core network element through NG-eNB configuration update, NG-gNB configuration update, an NG setup request, or a newly-defined message in an NG interface. The NG interface is an interface between a 5G core network element and an access network element, the NG-eNB configuration update is a configuration update message of the 5G core network element and a 4G base station, the NG-gNB configuration update is a configuration update message of the 5G core network element and the 5G base station, the NG setup request is a 5G interface setup request message, and the newly-defined message is a network slice update configuration message.

In step S202, the core network element receives the registration request of the terminal.

The registration request is sent to the core network element by the master base station. The registration request is used for notifying the core network element of a network slice service to be acquired by the terminal.

In step S203, the core network element configures registration network slice information according to the joint network slice information and the registration request.

The registration network slice information includes: a registration region where the terminal is allowed to register, and slice capability information about a network slice service that the terminal is allowed to acquire.

In an embodiment, the joint network slice information may include: a registration region of the master base station, the slice capability information of the master base station, and the slice capability information of the secondary base station. If the registration request indicates that the terminal expects to acquire the network slice service of the secondary base station, the registration network slice information includes: the registration region of the master base station and the slice capability information of the secondary base station. If the registration request indicates that the terminal expects to acquire the network slice service of the master base station, the registration network slice information includes: the registration region of the master base station and the slice capability information of the master base station. If the registration request indicates that the terminal expects to acquire the network slice service of the secondary base station and the network slice service of the master base station, the registration network slice information includes: the registration region of the master base station, the slice capability information of the master base station and the slice capability information of the secondary base station.

In an embodiment, the joint network slice information includes: the registration region of the master base station, the slice capability information of the master base station, the registration region of the secondary base station and the slice capability information of the secondary base station. If the registration request indicates that the terminal expects to acquire the network slice service of the secondary base station, the registration network slice information includes: the registration region of the secondary base station and the slice capability information of the secondary base station. If the registration request indicates that the terminal expects to acquire the network slice service of the master base station, the registration network slice information includes: the registration region of the master base station and the slice capability information of the master base station. If the registration request indicates that the terminal expects to acquire the network slice service of the secondary base station and the network slice service of the master base station, the registration network slice information includes: the registration region of the master base station, the slice capability information of the master base station, the registration region of the secondary base station and the slice capability information of the secondary base station.

In an embodiment, the joint network slice information includes: the registration region of the master base station, the slice capability information of the master base station, the registration region of the secondary base station, the slice capability information of the secondary base station and indication information. If the registration request indicates that the terminal expects to acquire the network slice service of the secondary base station, the registration network slice information includes: the registration region of the secondary base station, the slice capability information of the secondary base station, and the indication information. If the registration request indicates that the terminal expects to acquire the network slice service of the master base station, the registration network slice information includes: the registration region of the master base station and the slice capability information of the master base station. If the registration request indicates that the terminal expects to acquire the network slice service of the secondary base station and the network slice service of the master base station, the registration network slice information includes: the registration region of the master base station, the slice capability information of the master base station, the registration region of the secondary base station, the slice capability information of the secondary base station and the indication information.

In step S204, the core network element sends the registration network slice information to the master base station.

After step S204, the master base station sends the received registration network slice information to the terminal. After receiving the registration network slice information, the terminal acquires the network slice service according to the registration network slice information.

In an embodiment, on the basis of the above steps, the master base station broadcasts the network slice information of the secondary base station and the network slice information of the master base station. After receiving the broadcast information, the terminal initiates a registration request based on the information. According to the network slice information of the master base station and the secondary base station (the network slice information includes the registration region and the slice capability information), and the terminal selects a possible registration region and slice capability to perform the registration request.

In the embodiment, the master base station receives the network slice information of the secondary base station, generates the joint network slice information according to the network slice information of the master base station and the network slice information of the secondary base station, and sends the joint network slice information to the core network element. After receiving the registration request sent by the terminal, the master base station forwards the registration request to the core network element. The core network element configures the registration network slice information according to the registration request and the network slice information and gives the registration network slice information to the master base station. The master base station sends the registration network slice information to the terminal after receiving the registration network slice information sent by the core network element. Finally, the terminal acquires a network slice service according to the registration network slice information. Through the above solution, the core network element may configure the registration network slice information for the terminal according to the network slice information of the secondary base station having no control plane connection with the core network element, so that the terminal may acquire the network slice service corresponding to the network slice information of the secondary base station.

Figure 6:
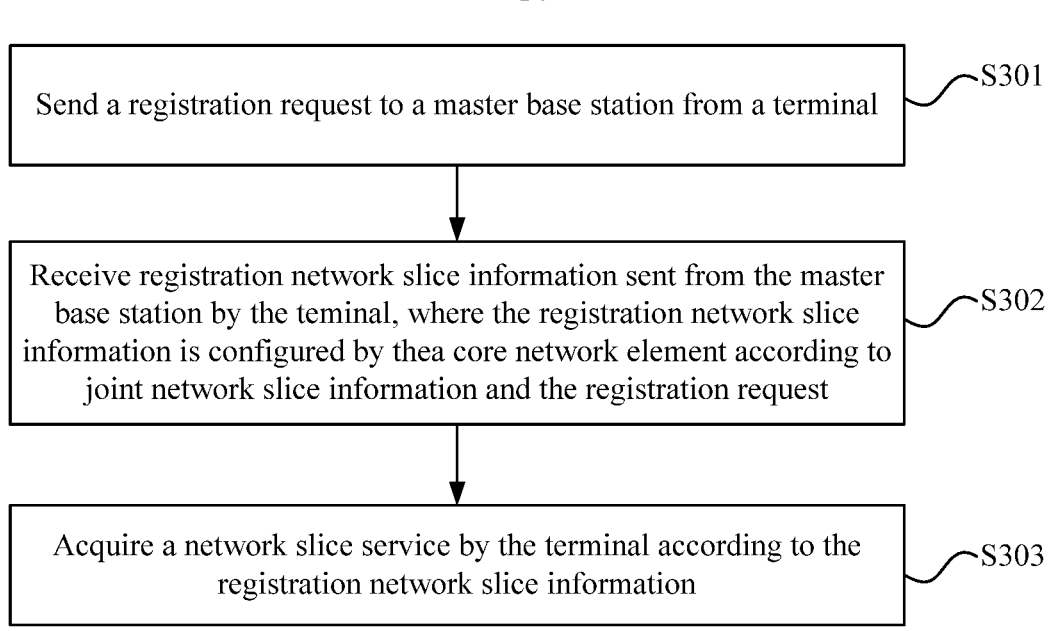
FIG. 6 is a flowchart illustrating a method for configuring a network slice according to yet another embodiment of the present application.

An embodiment of the present application is shown in FIG. 6. FIG. 6 shows a method for configuring a network slice. The method is applied to a terminal, and includes steps S301, S302 and S303.

In step S301, a terminal sends a registration request to a master base station.

In step S302, the terminal receives registration network slice information sent from the master base station, where the registration network slice information is configured by a core network element according to joint network slice information and the registration request.

In step S303, the terminal acquires a network slice service according to the registration network slice information.

In this embodiment, the terminal sends the registration request to the master base station, and receives the registration network slice information sent from the master base station, and acquires the network slice service according to the registration network slice information. Through the above solution, since the joint network slice information may include the network slice information of the secondary base station, the terminal may acquire the network slice service corresponding to the network slice information of the secondary base station.

Before step S301, the master base station receives the network slice information of the secondary base station sent from the secondary base station, and generates the joint network slice information according to the network slice information of the master base station and the network slice information of the secondary base station. The master base station further sends the joint network slice information to the core network element.

The network slice information of the master base station includes: a registration region of the master base station and slice capability information of the master base station (i.e., a registration region and slice capability information supported by the master base station). The network slice information of the secondary base station includes: a registration region of the secondary base station and slice capability information of the secondary base station (i.e., a registration region and slice capability information supported by the secondary base station).

According to two manners of generating the joint network slice information by the master base station, the joint network slice information may include one of the following (1) to (3): (1) the registration region of the master base station, the slice capability information of the master base station, and the slice capability information of the secondary base station; (2) the registration region of the master base station, the slice capability information of the master base station, the registration region of the secondary base station, and the slice capability information of the secondary base station; (3) the registration region of the master base station, the slice capability information of the master base station; the registration area of the secondary base station, the slice capability information of the secondary base station, and indication information.

The indication information is used for indicating whether the terminal satisfies the multi-connection condition, and may include at least one of: a multi-connection relationship between the registration region of the secondary base station and the registration region of the master base station; a multi-connection relationship between the registration region of the secondary base station and the slice capability information of the master base station; a multi-connection relationship between the slice capability information of the secondary base station and the registration region of the master base station; a multi-connection relationship between the slice capability information of the secondary base station and the slice capability information of the master base station. The multi-connection relationship is used for indicating that the terminal satisfies the multi-connection condition.

The joint network slice information may be sent to the core network element through NG-eNB configuration update, NG-gNB configuration update, an NG setup request, or a newly-defined message in an NG interface. The NG interface is an interface between a 5G core network element and an access network element, the NG-eNB configuration update is a configuration update message of the 5G core network element and a 4G base station, the NG-gNB configuration update is a configuration update message of the 5G core network element and the 5G base station, the NG setup request is a 5G interface setup request message, and the newly-defined message is a network slice update configuration message.

In step S301, the terminal sends the registration request to the master base station.

The registration request is used for notifying the core network element of a network slice service to be acquired by the terminal.

After step S301, the master base station sends the registration request to the core network element. The core network element configures registration network slice information according to the joint network slice information and the registration request. The master base station receives the registration network slice information sent from the core network element.

In step S302, the terminal receives the registration network slice information sent from the master base station.

The registration network slice information includes: a registration region where the terminal is allowed to register, and slice capability information about a network slice service that the terminal is allowed to acquire.

In an embodiment, the joint network slice information may include: a registration region of the master base station, the slice capability information of the master base station, and the slice capability information of the secondary base station. If the registration request indicates that the terminal expects to acquire the network slice service of the secondary base station, the registration network slice information includes: the registration region of the master base station and the slice capability information of the secondary base station. If the registration request indicates that the terminal expects to acquire the network slice service of the master base station, the registration network slice information includes: the registration region of the master base station and the slice capability information of the master base station. If the registration request indicates that the terminal expects to acquire the network slice service of the secondary base station and the network slice service of the master base station, the registration network slice information includes: the registration region of the master base station, the slice capability information of the master base station and the slice capability information of the secondary base station.

In an embodiment, the joint network slice information includes: the registration region of the master base station, the slice capability information of the master base station, the registration region of the secondary base station and the slice capability information of the secondary base station. If the registration request indicates that the terminal expects to acquire the network slice service of the secondary base station, the registration network slice information includes: the registration region of the secondary base station and the slice capability information of the secondary base station. If the registration request indicates that the terminal expects to acquire the network slice service of the master base station, the registration network slice information includes: the registration region of the master base station and the slice capability information of the master base station. If the registration request indicates that the terminal expects to acquire the network slice service of the secondary base station and the network slice service of the master base station, the registration network slice information includes: the registration region of the master base station, the slice capability information of the master base station, the registration region of the secondary base station and the slice capability information of the secondary base station.

In an embodiment, the joint network slice information includes: the registration region of the master base station, the slice capability information of the master base station, the registration region of the secondary base station, the slice capability information of the secondary base station and indication information. If the registration request indicates that the terminal expects to acquire the network slice service of the secondary base station, the registration network slice information includes: the registration region of the secondary base station, the slice capability information of the secondary base station, and the indication information. If the registration request indicates that the terminal expects to acquire the network slice service of the master base station, the registration network slice information includes: the registration region of the master base station and the slice capability information of the master base station. If the registration request indicates that the terminal expects to acquire the network slice service of the secondary base station and the network slice service of the master base station, the registration network slice information includes: the registration region of the master base station, the slice capability information of the master base station, the registration region of the secondary base station, the slice capability information of the secondary base station and the indication information.

In step S303, the terminal acquires the network slice service according to the registration network slice information.

In an embodiment, on the basis of the above steps, the master base station broadcasts the network slice information of the secondary base station and the network slice information of the master base station. After receiving the broadcast information, the terminal initiates a registration request based on the information. According to the network slice information of the master base station and the secondary base station (the network slice information includes the registration region and the slice capability information), and the terminal selects a possible registration region and slice capability to perform the registration request.

In the embodiment, the master base station receives the network slice information of the secondary base station, generates the joint network slice information according to the network slice information of the master base station and the network slice information of the secondary base station, and sends the joint network slice information to the core network element. After receiving the registration request sent from the terminal, the master base station forwards the registration request to the core network element. The core network element configures the registration network slice information according to the registration request and the network slice information and gives the registration network slice information to the master base station. The master base station sends the registration network slice information to the terminal after receiving the registration network slice information sent from the core network element. Finally, the terminal acquires a network slice service according to the registration network slice information. After the terminal sends the registration request to the master base station, the master base station sends the registration request to the core network element. The core network element configures the registration network slice information according to the registration request and the network slice information and gives the registration network slice information to the master base station. The terminal receives the registration network slice information sent from the master base station, and acquires the network slice service according to the registration network slice information. Through the above solution, the terminal may acquire the network slice service corresponding to the network slice information of the secondary base station.

Figure 7:
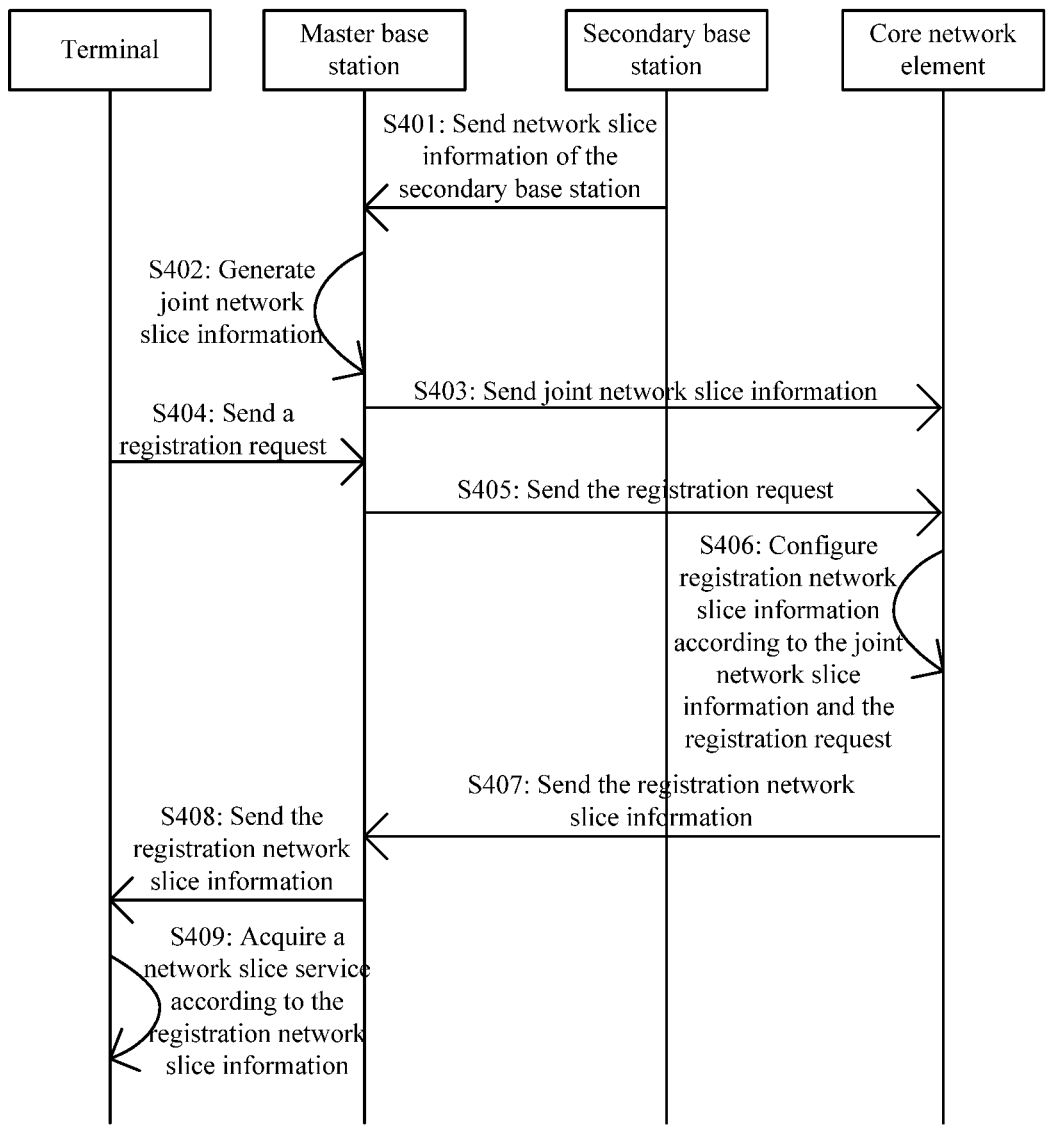
FIG. 7 is a schematic diagram illustrating a system for configuring a network slice according to an embodiment of the present application.

An embodiment of the present application is shown in FIG. 7. FIG. 7 shows a system for configuring a network slice. The system includes a master base station, a secondary base station, a terminal and a core network element.

In this system, the master base station, the secondary base station, the terminal, and the core network element execute steps S401 to S409.

In step S401, the secondary base station sends network slice information of the secondary base station to the master base station.

In step S402, the master base station generates joint network slice information according to network slice information of the master base station and the network slice information of the secondary base station.

In step S403, the master base station sends joint network slice information to the core network element.

In step S404, the terminal sends a registration request to the master base station.

In step S405, the master base station sends the registration request to the core network element.

In step S406, the core network element configures registration network slice information for the terminal according to the joint network slice information and the registration request.

In step S407, the core network element sends the registration network slice information to the master base station.

In step S408, the master base station sends the registration network slice information to the terminal.

In step S409, the terminal acquires a network slice service according to the registration network slice information.

In an embodiment, the above steps may also include: broadcasting the network slice information of the secondary base station and the network slice information of the master base station by the master base station.

Figure 8:
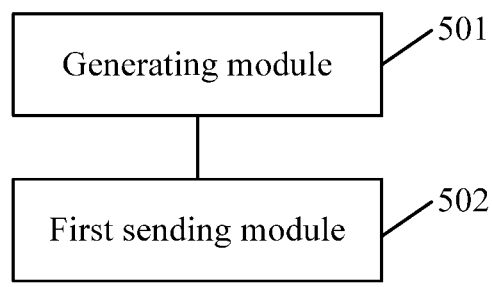
FIG. 8 is a schematic diagram illustrating a device for configuring a network slice according to an embodiment of the present application.

An embodiment of the present application is shown in FIG. 8. FIG. 8 shows a device for configuring a network slice. The device is applied to a master base station, and includes a generating module 501 and a first sending module 502.

The generating module 501 is configured to generate joint network slice information according to network slice information of the master base station and network slice information of a secondary base station.

A first sending module 502 is configured to send the joint network slice information to a core network element.

Figure 9:
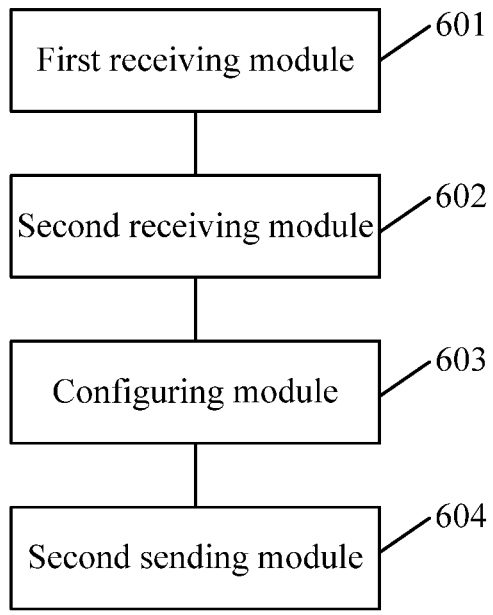
FIG. 9 is a schematic diagram illustrating a device for configuring a network slice according to another embodiment of the present application.

An embodiment of the present application is shown in FIG. 9. FIG. 9 shows a device for configuring a network slice. The device is applied to a core network element, and includes a first receiving module 601, a second receiving module 602, a configuring module 603 and a second sending module 604.

The first receiving module 601 is configured to receive joint network slice information sent from a master base station.

The second receiving module 602 is configured to receive a registration request sent from a terminal.

The configuring module 603 is configured to configure registration network slice information according to the joint network slice information and the registration request.

The second sending module 604 is configured to send the registration network slice information to the master base station.

Figure 10:
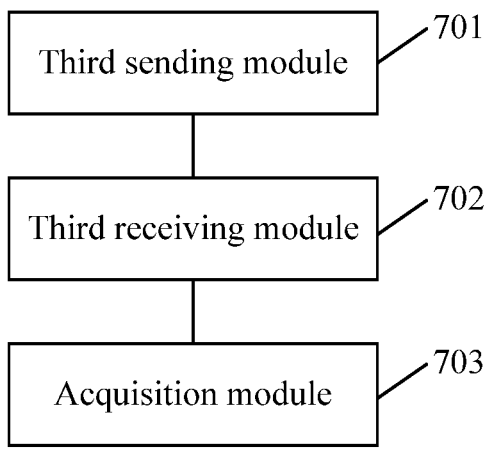
FIG. 10 is a schematic diagram illustrating a device for configuring a network slice according to yet another embodiment of the present application.

An embodiment of the present application is shown in FIG. 10. FIG. 10 shows a device for configuring a network slice. The device is applied to a terminal, and includes a third sending module 701, a third receiving module 702 and an acquisition module 703.

The third sending module 701 is configured to send a registration request to a master base station.

The third receiving module 702 is configured to receive registration network slice information sent from the master base station, where the registration network slice information is configured by the core network element according to joint network slice information and the registration request.

The acquisition module 703 is configured to acquire a network slice service according to the registration network slice information.

It is to be noted that the generating module 501, the first sending module 502, the first receiving module 601, the second receiving module 602, the configuring module 603, the second sending module 604, the third sending module 701, the third receiving module 702, the acquisition module 703 are implemented by software or hardware. For the latter, it is able to be implemented, but is not limited to the following manners: functions of the above modules are implemented by the same processor; or functions of any combination of the above modules are processed by multiple processes.

An embodiment of the present application provides a method for configuring a network slice. A scenario in which the method is applied includes a master base station, secondary base station 1, a terminal and a core network element.

Based on the above scenario, the method of the embodiment includes steps 1 to 7.

In step 1, the secondary base station 1 sends network slice information of the secondary base station 1 to the master base station.

The network slice information of the secondary base station 1 includes: a registration region of the secondary base station 1, slice capability information 1 of the secondary base station 1, and slice capability information 2 of the secondary base station 1 (the secondary base station 1 has two types of network slice services which are able to be provided to the terminal, respectively corresponding to the slice capability information 1 and the slice capability information 2 of the secondary base station 1).

In step 2, the master base station generates joint network slice information according to the network slice information of the master base station and the network slice information of the secondary base station 1.

The network slice information of the master base station includes: a registration region of the master base station, slice capability information 1 of the master base station, and slice capability information 2 of the master base station (the master base station has two types of network slice services which are able to be provided to the terminal, respectively corresponding to the slice capability information 1 and the slice capability information 2 of the master base station).

The registration region of the master base station is TA1 and the registration region of the secondary base station is TA2.

The joint network slice information includes TA1, TA2, the slice capability information 1 of the secondary base station 1, the slice capability information 2 of the secondary base station 1, the slice capability information 1 of the master base station, the slice capability information 2 of the master base station, and a multi-connection relationship between TA1 and TA2.

In step 3, the master base station sends the joint network slice information to the core network element.

In the step 4, the terminal sends a registration request to the master base station, and the master base station sends the registration request to the core network.

The registration request is used for indicating that the network slice service to be acquired by the terminal is a network slice service corresponding to the slice capability information 1 of the secondary base station 1 and the slice capability information 2 of the master base station.

In step 5, the core network element configures registration network slice information for the terminal according to the joint network slice information and the registration request.

In this embodiment, the registration network slice information is shown in Table 1.

TABLE 1

| Registration region | Slice capability information |
|---|---|
| TA1 | Slice capability information 2 of the master base station |
| TA2 | Slice capability information 1 of the secondary base station 1, multi-connection relationship between TA1 and TA2 |

In step 6, the core network element sends the registration network slice information to the master base station, the master base station sends the registration network slice information to the terminal.

In step 7, the terminal acquires a network slice service corresponding to the slice capability information 2 of the master base station and a network slice service corresponding to the slice capability information 1 of the secondary base station 1 according to the registration network slice information.

On the basis of a previous embodiment, the embodiment provides a method for configuring a network slice. The method is applied in a scenario where second base station 2 is added based on the previous master base station and the secondary base station 1. A network slice service provided by the secondary base station 2 is different from that provided by the master base station and the secondary base station 1.

Based on the above scenario, the method of the embodiment includes steps 1 to 7.

In step 1, the secondary base station 1 and the secondary base station 2 send an interface establishment request to the master base station. The interface establishment request carries network slice information of the secondary base station 1 and the secondary base station 2.

The interface establishment request may be an Xn interface establishment request. The network slice information of the secondary base station 2 includes: a registration region of the secondary base station 2 (TA3 in this embodiment), slice capability information 1 of the secondary base station 2, and slice capability information 2 of the secondary base station 2.

In step 2, the master base station generates joint network slice information according to the network slice information of the master base station, the network slice information of the secondary base station 1 and the secondary base station 2.

The joint network slice information includes TA1, TA2, TA3, the slice capability information of the secondary base station 1, the slice capability information 2 of the secondary base station 1, the slice capability information 1 of the secondary base station 2, the slice capability information 2 of the secondary base station 2, the slice capability information 1 of the master base station, the slice capability information 2 of the master base station, a multi-connection relationship between TA1 and TA2 and a multi-connection relationship between TA1 and TA3.

In step 3, the master base station sends the joint network slice information to the core network element.

In step 4, the terminal sends a registration request to the master base station, and the master base station sends the registration request to the core network.

The registration request is used for indicating that the network slice service to be acquired by the terminal is a network slice service corresponding to the slice capability information 2 of the secondary base station 1 and the slice capability information 1 of the secondary base station 2.

In step 5, the core network element configures registration network slice information for the terminal according to the joint network slice information and the registration request.

In this embodiment, the registration network slice information is shown in Table 2.

TABLE 2

| Registration region | Slice capability information |
| --- | --- |
| TA2 | Slice capability information 2 of the secondary base station 1 and the multi-connection relationship between TA1 and TA2 |
| TA3 | Slice capability information 1 of the secondary base station 2, and the multi-connection relationship between TA1 and TA3 |

In step 6, the core network element sends the registration network slice information to the master base station, and the master base station sends the registration network slice information to the terminal.

In step 7, the terminal acquires a network slice service corresponding to the slice capability information 2 of the secondary base station 1 and a network slice service corresponding to the slice capability information 1 of the secondary base station 2 according to the registration network slice information.

Based on the previous embodiment, this embodiment provides a method of a terminal for acquiring a network slice service. In this embodiment, the terminal has received the registration network slice information sent from the master base station. The registration network slice information is shown in Table 3.

TABLE 3

| Registration region | Slice capability information |
| --- | --- |
| TA2 | Slice capability information 2 of the secondary base station 1 and a multi-connection relationship between TA1 and TA2 |
| TA3 | Slice capability information 1 of the secondary base station 2, and a multi-connection relationship between TA1 and TA3 |

Based on the above scenario, the method of the embodiment includes steps 1 and 2.

In step 1, the core network element initiates a data connection with the terminal.

The core network element initiates a data connection request to the master base station. The data connection request may be a PDU session resource setup request, and the data connection request carries the slice capability information 1 of the secondary base station 2, the multi-connection relationship between TA1 and TA3, and TA3. That is, in this data connection request, the core network element causes the terminal to acquire the network slice service corresponding to the slice capability information 1 of the secondary base station 2.

In step 2, the master base station configures the multi-connection.

The master base station receives the data connection request, acquires the slice capability information 1 of the secondary base station 2, the multi-connection relationship between TA1 and TA3, as well as TA3. However, in fact, the master base station can only provide the terminal with the slice capability information 1 of the master base station and the network slice service corresponding to the slice capability information 1 of the master base station. Therefore, the master base station further queries the secondary base station 2 which is able to provide the network slice service corresponding to the slice capability information 1 of the secondary base station 2 for the terminal.

Since the data connection request includes the multi-connection relationship between TA1 and TA3, it may be determined that the terminal satisfies the multi-connection condition, the master base station configures the multi-connection for the terminal.

The master base station may configure a dual-connection for the terminal through related technologies. Reference may be made to the description of the dual-connection in 3GPP protocols 36.300. The user plane of the data connection is finally configured on the secondary base station 2. Under the dual-connection, a control plane of the terminal is connected to the master base station and connected to a control plane entity of the core network element through the master base station. The data connection of the slice service corresponding to the slice capability information of the secondary base station 2 to which the terminal belongs is connected to the secondary base station 2 and connected to a user plane entity of the core network element through secondary base station 2.

In an embodiment, if the terminal does not satisfy a condition for configuring the multi-connection, and the data connection of the terminal can only be executed in a specified slice, the master base station rejects a data connection request. For example, when the terminal moves out of a coverage area of the secondary base station 2, the core network element initiates a data connection to the terminal and connects to the slice service corresponding to the slice capability information belonging to the secondary base station 2, the secondary base station 2 rejects a data setup request.

An embodiment of the present application provides a master base station. The master base station includes a processor and a memory coupled to the processor. The memory stores a program for configuring a network slice which is able to be operated on the processor, and when executed by the processor, the program implements steps S101 to S102.

In step S101, a master base station generates joint network slice information according to network slice information of the master base station and network slice information of a secondary base station.

In step S102, the master base station sends the joint network slice information to a core network element.

In other embodiments providing the master base station, the processor of the master base station may also implement the steps executed by the master base station or other steps that may be executed by the master base station.

An embodiment of the present application provides a core network element. The core network element includes a processor and a memory coupled to the processor. The memory stores a program for configuring a network slice which is able to be operated on the processor, and when executed by the processor, the program implements steps S201 to S204.

In step S201, a core network element receives joint network slice information.

In step S202, the core network element receives a registration request of the terminal.

In step S203, the core network element configures registration network slice information according to the joint network slice information and the registration request.

In step S204, the core network element sends the registration network slice information to a master base station.

In other embodiments providing the core network element, the processor of the core network element may also implement the steps executed by the core network element or other steps that may be executed by the core network element.

An embodiment of the present application provides a terminal. The terminal includes a processor and a memory coupled to the processor. The memory stores a program for configuring a network slice which is able to be operated on the processor, and when executed by the processor, the program implements steps S301 to S303.

In step S301, a terminal sends a registration request to a master base station.

In step S302, the terminal receives registration network slice information sent from the master base station, where the registration network slice information is configured by the core network element according to joint network slice information and registration request.

In step S303, the terminal acquires a network slice service according to the registration network slice information.

In other embodiments providing the terminal, the processor of the terminal may also implement the steps executed by the terminal or other steps that may be executed by the terminal.

An embodiment of the present application further provides a storage medium. In the present embodiment, the storage medium may be configured to store program codes for executing steps S101 to S102 described below.

In step S101, a master base station generates joint network slice information according to network slice information of the master base station and network slice information of a secondary base station.

In step S102, the master base station sends the joint network slice information to a core network element.

In this embodiment, the storage medium may include, but is not limited to, a USB flash disk, a read-only memory (ROM), a random access memory (RAM), a mobile hard disk, a magnetic disk, an optical disk or another medium capable of storing program codes.

In this embodiment, a processor may execute the steps of the method described in the above embodiments according to program codes stored in the storage medium.

In other embodiments providing a storage medium, the storage medium may be further configured to store steps configured to be executed by the master base station in the above method embodiments, and other steps that may be executed by the master base station.

An embodiment of the present application further provides a storage medium. In the present embodiment, the storage medium may be configured to store program codes for executing steps S201 to S204 described below.

In step S201, a core network element receives joint network slice information;

In step S202, the core network element receives a registration request of the terminal.

In step S203, the core network element configures registration network slice information according to the joint network slice information and the registration request.

In step S204, the core network element sends the registration network slice information to the master base station.

In this embodiment, the storage medium may include, but is not limited to: a U disk, a read-only memory (ROM), a random access memory (RAM), a mobile hard disk, a magnetic disk, an optical disk or another medium capable of storing program codes.

In this embodiment, a processor may execute the steps of the method described in the above embodiments according to program codes stored in the storage medium.

In other embodiments providing a storage medium, the storage medium may be further configured to store steps configured to be executed by the core network element in the above method embodiments, and other steps that may be executed by the core network element.

An embodiment of the present application further provides a storage medium. In the present embodiment, the storage medium may be configured to store program codes for executing steps S301 to S303 described below.

In step S301, a terminal sends a registration request to a master base station.

In step S302, the terminal receives registration network slice information sent from the master base station, where the registration network slice information is configured by the core network element according to joint network slice information and registration request.

In step S303, the terminal acquires a network slice service according to the registration network slice information.

In this embodiment, the storage medium may include, but is not limited to, a USB flash disk, a read-only memory (ROM), a random access memory (RAM), a mobile hard disk, a magnetic disk, an optical disk or another medium capable of storing program codes.

In this embodiment, a processor may execute the steps of the method described in the above embodiments according to program codes stored in the storage medium.

In other embodiments providing a storage medium, the storage medium may be further configured to store steps configured to be executed by the terminal in the above method embodiments, and other steps that may be executed by the terminal.

Those skilled in the art should know that various modules or steps described above of the present application may be implemented by a universal computing device, the various modules or steps may be concentrated on a single computing device or distributed in a network composed of multiple computing devices. In an embodiment, the various modules or steps may be implemented by program codes executable by the computing devices, so that they may be stored in a storage device for execution by the computing devices, and in some circumstances, the illustrated or described steps may be executed in sequences different from those described herein, or they may be made into various integrated circuit modules separately, or multiple modules or steps therein may be made into a single integrated circuit module for implementation.

What is claimed is:

1. A method for configuring a network slice, comprising:
generating joint network slice information by a master base station according to network slice information of the master base station and network slice information of a secondary base station; and
sending the joint network slice information to a core network element from the master base station, so that the core network element acquires the network slice information of the secondary base station according to the joint network slice information;
wherein the master base station has a control plane connection to the core network element, and the secondary base station is in a dual-connected or a multi-connected working mode and has no control plane connection to the core network element.

2. The method of claim 1, further comprising:
acquiring the network slice information of the secondary base station by the master base station.

3. The method of claim 2, wherein the network slice information of the secondary base station comprises slice capability information and a registration region of the secondary base station, and the network slice information of the master base station comprises slice capability information and a registration region of the master base station.

4. The method of claim 3, wherein generating joint network slice information by a master base station according to network slice information of the master base station and network slice information of a secondary base station comprising:
adding the slice capability information of the secondary base station in the network slice information of the master base station by the master base station.

5. The method of claim 3, wherein generating joint network slice information by a master base station according to network slice information of the master base station and network slice information of a secondary base station comprising:
adding the slice capability information and the registration region of the secondary base station in the network slice information of the master base station by the master base station.

6. The method of claim 5, the joint network slice information comprises indication information for indicating whether a terminal satisfies a multi-connection condition.

7. The method of claim 6, wherein the indication information comprises at least one of:
a multi-connection relationship between the registration region of the secondary base station and the registration region of the master base station;
a multi-connection relationship between the slice capability information of the master base station and the registration region of the secondary base station;
a multi-connection relationship between the slice capability information of the secondary base station and the registration region of the master base station;
a multi-connection relationship between the slice capability information of the secondary base station and the slice capability information of the master base station;
wherein the multi-connection relationship is used for indicating that the terminal satisfies the multi-connection condition.

8. The method of claim 7, further comprising:
broadcasting the network slice information of the master base station and the network slice information of the secondary base station by the master base station.

9. The method of claim 1, further comprising:
receiving, by the master base station, a registration request sent from a terminal;
sending the registration request to the core network element from the master base station;
receiving, by the master base station, registration network slice information sent from the core network element, wherein the registration network slice information is configured by the core network element according to the joint network slice information and the registration request; and
sending the registration network slice information to the terminal from the master base station.

10. A method for configuring a network slice, comprising:
receiving, by a core network element, joint network slice information from a master base station, and acquiring network slice information of a secondary base station according to the joint network slice information;
receiving a registration request of a terminal by the core network element;
configuring registration network slice information by the core network element according to the joint network slice information and the registration request; and
sending the registration network slice information to the master base station from the core network element;
wherein the master base station has a control plane connection to the core network element, and the secondary base station is in a dual-connected or a multi-connected working mode and has no control plane connection to the core network element.

11. The method of claim 10, wherein the registration network slice information comprises: a registration region where the terminal is allowed to register, and slice capability information about a network slice service that the terminal is allowed to acquire.

12. A method for configuring a network slice, comprising:
sending a registration request to a master base station from a terminal;
receiving, by the terminal, registration network slice information sent from a master base station, wherein the registration network slice information is configured by a core network element according to joint network slice information and the registration request, wherein the core network element acquires network slice information of a secondary base station according to the joint network slice information; and acquiring a network slice service by the terminal according to the registration network slice information;

wherein the master base station has a control plane connection to the core network element, and the secondary base station is in a dual-connected or a multi-connected working mode and has no control plane connection to the core network element.

13. The method of claim 12, wherein the registration network slice information comprises: a registration region where the terminal is allowed to register, and slice capability information about a network slice service that the terminal is allowed to acquire.

14. A device for configuring a network slice, comprising: a processor and a storage device for storing computer executable instructions that when executed by the processor cause the processor to perform the method according to claim 1.

15. A device for configuring a network slice, comprising: a processor and a storage device for storing computer executable instructions that when executed by the processor cause the processor to perform the method according to claim 10.

16. A device for configuring a network slice, comprising: a processor and a storage device for storing computer executable instructions that when executed by the processor cause the processor to perform the method according to claim 12.

17. A non-transient computer-readable storage medium storing at least one program, wherein the at least one program is executable by at least one processor, to perform the method for configuring a network slice of claim 1.

18. A processor, which is configured to execute programs that, when executed, perform the method for configuring a network slice of claim 1.

* * * * *